(12) United States Patent
Mitra et al.

(10) Patent No.: US 9,185,073 B2
(45) Date of Patent: Nov. 10, 2015

(54) SYSTEMS AND METHODS FOR DATA PACKET PROCESSING

(75) Inventors: Alok Mitra, San Diego, CA (US); Venkata Satish Kumar Vangala, San Diego, CA (US); Rohit Tripathi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/267,863

(22) Filed: Oct. 6, 2011

(65) Prior Publication Data

US 2013/0091303 A1    Apr. 11, 2013

(51) Int. Cl.
| | |
|---|---|
| G06F 15/173 | (2006.01) |
| H04L 29/12 | (2006.01) |
| H04L 12/701 | (2013.01) |
| H04L 29/06 | (2006.01) |
| H04L 12/707 | (2013.01) |

(52) U.S. Cl.
CPC ............ H04L 61/2557 (2013.01); H04L 29/06 (2013.01); H04L 45/00 (2013.01); H04L 45/22 (2013.01); H04L 61/2514 (2013.01)

(58) Field of Classification Search
CPC .......... H04L 45/00; H04L 45/22; H04L 29/06
USPC ............... 709/238–244; 370/389–392
See application file for complete search history.

(56) References Cited

U.S. PATENT DOCUMENTS

| | | | |
|---|---|---|---|
| 5,815,516 A | 9/1998 | Aaker et al. | |
| 6,453,357 B1 | 9/2002 | Crow et al. | |
| 6,711,164 B1 | 3/2004 | Le et al. | |
| 7,769,015 B2 | 8/2010 | Huang et al. | |
| 2002/0071437 A1* | 6/2002 | Nishikado et al. | 370/395.63 |
| 2003/0009561 A1* | 1/2003 | Sollee | 709/227 |
| 2003/0081582 A1 | 5/2003 | Jain et al. | |
| 2006/0088030 A1* | 4/2006 | Beeson et al. | 370/389 |
| 2007/0169179 A1* | 7/2007 | Narad | 726/4 |
| 2008/0219281 A1* | 9/2008 | Akin et al. | 370/419 |
| 2008/0268848 A1* | 10/2008 | Tomoe et al. | 455/436 |

(Continued)

FOREIGN PATENT DOCUMENTS

| | | |
|---|---|---|
| JP | 2000253064 A | 9/2000 |
| JP | 2003244233 A | 8/2003 |

(Continued)

OTHER PUBLICATIONS

Bagnulo M. et al., "Stateful NAT64: Network Address and Protocol Translation from IPv6 Clients to IPv4 Servers", rfc6146.txt, Internet Engineering Task Force (IETF), Standard Internet Society (ISOC), Rue Des Falaises CH-1205 Geneva, Switzerland, Apr. 27, 2011, pp. 1-45, XP015075988.

(Continued)

*Primary Examiner* — Chris Parry
*Assistant Examiner* — Weiwei Stiltner
(74) *Attorney, Agent, or Firm* — Howard Seo

(57) ABSTRACT

Systems and methods for performing efficient network address (NAT) translation are described herein. In some aspects, partial NAT entries are created for data packets before all the IP fragments of the data packets are received. Further, the IP fragments are transmitted before all the IP fragments of the data packets are received. In some aspects, unique IP-IDs are generated for IP fragments and/or data packets at a NAT device.

24 Claims, 6 Drawing Sheets

(56) References Cited

U.S. PATENT DOCUMENTS

| | | |
|---|---|---|
| 2009/0067325 A1* | 3/2009 | Baratakke et al. ............ 370/229 |
| 2009/0300207 A1* | 12/2009 | Giaretta et al. ............... 709/232 |
| 2009/0316698 A1 | 12/2009 | Menten |
| 2010/0020800 A1 | 1/2010 | Abe et al. |
| 2010/0097931 A1* | 4/2010 | Mustafa ........................ 370/235 |
| 2010/0150148 A1* | 6/2010 | Kumar ........................... 370/389 |
| 2010/0228979 A1* | 9/2010 | Kudo ............................. 713/168 |
| 2011/0032942 A1 | 2/2011 | Matthews et al. |
| 2011/0199922 A1* | 8/2011 | Patel et al. .................... 370/252 |
| 2012/0044354 A1* | 2/2012 | Cheng et al. .................. 348/159 |
| 2012/0131177 A1* | 5/2012 | Brandt et al. ................. 709/224 |
| 2012/0275460 A1* | 11/2012 | Klotsche et al. ............. 370/392 |

FOREIGN PATENT DOCUMENTS

| | | |
|---|---|---|
| JP | 2005012698 A | 1/2005 |
| JP | 2011024180 A | 2/2011 |
| WO | 03036886 A2 | 5/2003 |
| WO | 03039107 A1 | 5/2003 |
| WO | WO 2009157967 A1 * | 12/2009 |

OTHER PUBLICATIONS

International Search Report and Written Opinion—PCT/US2012/059103—ISA/EPO—Apr. 9, 2013.
Taiwan Search Report—TW101136932—TIPO—Jun. 23, 2014.

* cited by examiner

SYSTEMS AND METHODS FOR DATA PACKET PROCESSING

BACKGROUND

1. Field

The present application relates generally to communications, and more specifically to systems, methods, and device (such as routers) for efficient processing of internet protocol (IP) fragments using network address translation (NAT) functionality.

2. Background

Communication systems are widely deployed to provide various types of communication (e.g., voice, data, multimedia services, etc.) between communication devices (e.g., mobile handsets, PDAs (Personal Data Assistants), personal computers, smart phones, servers, or any other electronic device capable of communicating via a network). The devices may transmit/receive data between each other via a network of interconnected devices. For example, client devices may exchange data with server devices over a network.

Due to the limited availability of IPv4 addresses for devices, client devices may access a network through another device, such as a device running network address translation (NAT) functionality (herein referred to as a "NAT device"). NAT devices may provide public domain access to a group of client devices (which may be grouped in a local area network (LAN)). A single publicly routeable IPv4 address may be assigned to the NAT device for the group of client devices to access the public network, instead of each client device having its own publicly routeable IPv4 address. This saves on the assignment of IPv4 addresses. Further, using a NAT device allows security protocols to be established at the NAT device that help protect all the client devices, since all the traffic flows through the NAT device.

For the client devices to communicate with a server device, the data sent from client devices to the server device is routed through the NAT device. For the server to communicate with the client devices, the server devices send data to the NAT device, and the NAT device sends the data to the client devices.

The NAT device may perform network address translation for the data exchanged between the client devices and server devices. Utilizing NAT, the NAT device may modify the internet protocol (IP) addresses of data packets from the client devices before sending the data packets to the server. Similarly, the NAT device may modify the IP addresses of data packets from the server before sending the data packets to the clients.

For example, the client devices may be part of a local network that uses "private" IP addresses for each of the client devices to communicate within the local network. These private IP addresses, however, may not enable the client devices to communicate with devices that reside on a "public" network, such as server devices that reside on the Internet. The NAT device, however, may be associated with a public IP address and enabled to communicate with devices on the public network. Accordingly, the NAT device may receive data packets from the client devices with private IP address, the packets being destined for devices on the public network. The NAT device may modify the private IP addresses of the data packets to reflect the public IP address of the NAT device and send the data packets to a server on the public network. The NAT device (e.g., a symmetric NAT device) may further modify other information in the data packets, such as transport layer port information in order to, for example, monitor multiple traffic flows from a single client device. The server may then send data packets in response to the NAT device using the public IP address. The NAT device must then determine to which client devices each response data packet belongs, and modify the response data packets to have the appropriate private IP addresses of the client devices.

In order to be able to perform NAT, the NAT device may need to wait before all the IP fragments of a data packet have arrived at the NAT from a client device before performing NAT and sending the data packet to the server, which may lead to delay sin communication and increased memory buffering requirements in the NAT device. This may be especially true where IP fragments arrive at the NAT device out of order with the first IP fragment arriving at the NAT device last as further discussed herein.

Further, in some instances, two or more client devices that are associated with the same NAT device may send IP datagrams or fragments to the same server using the same IP-ID for the datagrams or fragments. In such instances, after NAT is performed by the NAT device and the datagrams or fragments are sent to the server, the server may may not be able to distinguish between the datagrams or fragments from a first client and a second client device sent via the NAT device. This leads to inefficiencies and errors in communications. Thus, enhanced systems and methods of performing NAT are needed.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include efficient network address translation (NAT).

One embodiment of the disclosure provides a method for communicating in a network. The method comprises receiving a data packet fragment of a sequence of data packet fragments of an internet protocol (IP) data packet. The method comprises transmitting the data packet fragment before receipt of the entire sequence of data packet fragments.

Another embodiment of the disclosure provides a method for communicating in a network. The method comprises receiving data packet fragments having a first internet protocol identifier (IP-ID) over a first traffic flow. The method comprises generating a second IP-ID for the data packet fragments, wherein the second IP-ID is unique to the first flow. The method comprises transmitting the data packet fragments with the second IP-ID.

Another embodiment of the disclosure provides an apparatus for communicating in a network. The apparatus comprises a receiver configured to receive a data packet fragment of a sequence of data packet fragments of an internet protocol (IP) data packet. The apparatus comprises a transmitter configured to transmit the data packet fragment before receipt of the entire sequence of data packet fragments.

Another embodiment of the disclosure provides an apparatus for communicating in a network. The apparatus comprises a receiver configured to receive data packet fragments having a first internet protocol identifier (IP-ID) over a first traffic flow. The apparatus comprises a processor configured to generate a second IP-ID for the data packet fragments, wherein the second IP-ID is unique to the first flow. The apparatus comprises a transmitter configured to transmit the data packet fragments with the second IP-ID.

Another embodiment of the disclosure provides an apparatus for communicating in a network. The apparatus comprises means for receiving a data packet fragment of a sequence of data packet fragments of an internet protocol (IP) data packet. The apparatus comprises means for transmitting the data packet fragment before receipt of the entire sequence of data packet fragments.

Another embodiment of the disclosure provides an apparatus for communicating in a network. The apparatus comprises means for receiving data packet fragments having a first internet protocol identifier (IP-ID) over a first traffic flow. The apparatus comprises means for generating a second IP-ID for the data packet fragments, wherein the second IP-ID is unique to the first flow. The apparatus comprises means for transmitting the data packet fragments with the second IP-ID.

Another embodiment of the disclosure provides a computer readable medium comprising instructions. The instructions when executed cause an apparatus to receive a data packet fragment of a sequence of data packet fragments of an internet protocol (IP) data packet. The instructions when executed cause the apparatus to transmit the data packet fragment before receipt of the entire sequence of data packet fragments.

Another embodiment of the disclosure provides a computer readable medium comprising instructions. The instructions when executed cause an apparatus to receive data packet fragments having a first internet protocol identifier (IP-ID) over a first traffic flow. The instructions when executed cause the apparatus to generate a second IP-ID for the data packet fragments, wherein the second IP-ID is unique to the first flow. The instructions when executed cause the apparatus to transmit the data packet fragments with the second IP-ID.

DETAILED DESCRIPTION

Figure 1:
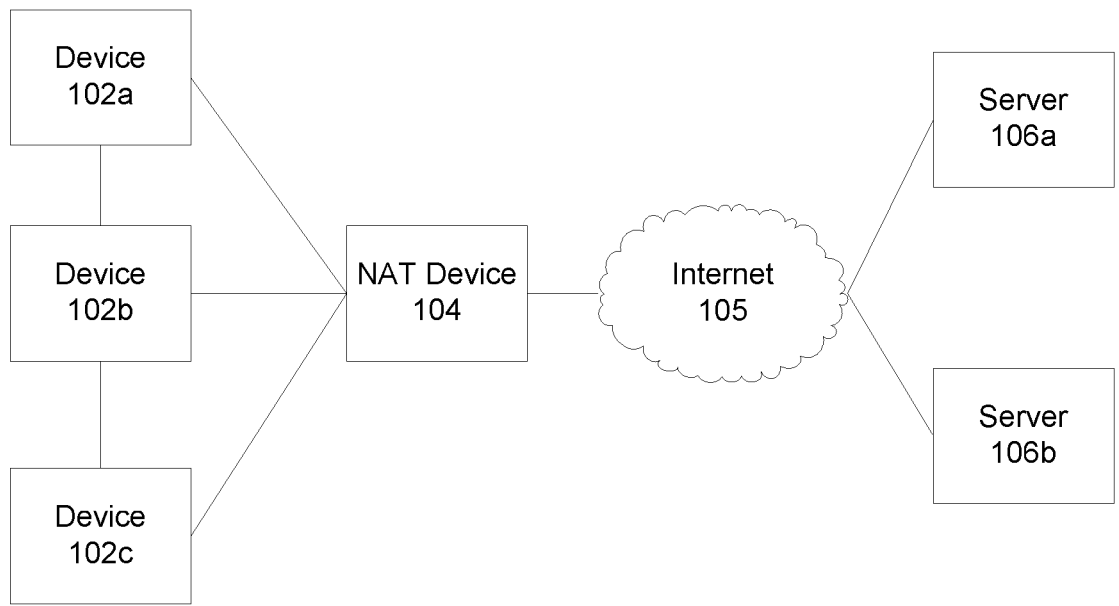
FIG. 1 illustrates exemplary interoperations of devices of a private network with devices of a public network via a network address translation (NAT) device.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, Local Area Networks (LAN), Personal Area Networks (PAN), Wide Area Networks (WAN), wired networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.9, IEEE 802.16, IEEE 802.20, Flash-OFDM", etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA) utilizes single carrier modulation and frequency domain equalization. SC-FDMA has similar performance and essentially similar overall complexity as an OFDMA system. An SC-FDMA signal has lower peak-to-average power ratio (PAPR) because of its inherent single carrier structure. SC-FDMA has drawn significant attention, especially in uplink communications where lower PAPR greatly benefits the mobile terminal in terms of transmit power efficiency. It is currently a working assumption for an uplink multiple access scheme in 3GPP Long Term Evolution (LTE), or Evolved UTRA (E-UTRA).

Systems and methods are described herein that perform efficient processing of internet protocol (IP) fragments through network address translation (NAT). In some aspects, the NAT may be performed by a SoftAP (software access point) device. The NAT discussed herein may be a "symmetric" type NAT, which involves storing transport header information in a NAT entry.

FIG. 1 illustrates exemplary interoperations of devices of a private network with devices of a public network via a NAT device. FIG. 1 illustrates a private network (e.g., a LAN, a PAN, a WAN, etc.) that is configured to support communication between a number of communication devices 102a-102c (e.g., mobile handsets, PDAs (Personal Data Assistants), personal computers, smart phones, servers, or any other electronic device capable of communicating via a network). The devices 102a-102c may communicate with each other in the private network using private IP addresses.

The communication devices 102a-102c may be interconnected by one or more wired or wireless communications links. The communications links may include one or more of the following types of communications links: GSM (Global System for Mobile communications), UMTS (Universal Mobile Telecommunications System), UMTS-TDD (UMTS-Time Division Duplexing), CDMA (Code Division Multiple Access), CDMA2000, WCDMA (Wideband CDMA), TDMA (Time Division Multiple Access), FDMA (Frequency Division Multiple Access), 1xEV-DO (Evolution-Data Optimized), Wi-Fi, Wi-Max, Bluetooth, or IEEE 802.11, telephone (e.g., POTS), cable, Ethernet, PLC (Power Line Communication), or fiber optic links, or any other link that allows a connection between devices. It should be noted that the private network may include more or less communication devices 102, and that there may be a different arrangement of links between the communication devices 102.

The communication devices 102 may further be configured to communicate with a NAT device 104 in the private network using a private IP address of the NAT device via one or more wireless and/or wired communication links such as those described above. The NAT device 104 may further be connected to a public network, such as the Internet 105 via one or more wireless and/or wired communication links such as those described above. The NAT device 104 may be a SoftAP, an access point, or some other suitable device configured to perform NAT of data packets transmitted from the client devices 102 and destined for devices (e.g., servers or other devices) on the Internet 105. For example, the client devices 102 may transmit data packets (e.g., IP data packets) for the server 106a and/or the server 106b that get routed to the NAT device 104. The data packets may include a private IP address of the client device 102 that transmitted the data packet to indicate the source of the data packet. The NAT device 104 may change the private IP address of the data packet that is used for communication in the private network to a public IP address that is used for communication on the Internet. The public IP address may be a public IP address associated with the NAT device 104. The NAT device 104 may further translate transport level information of the data packet such as a private port used for communication on the private network to a public port used for communication on the Internet 105. The NAT device 104 may further transmit the data packets from the client devices 102 to the devices on the Internet 105 such as the servers 106a and/or 106b. The servers 106a and/or 106b may process the data packets and send response data packets to the NAT device 104 destined for the client devices 102. The NAT device 104 may change the public IP addresses of the response data packets to the appropriate private IP addresses of the client devices 102 and transmit the response data packets to the client devices 102. The NAT device 104 may further translate transport level information of the data packet such as a public port used for communication on the Internet 105 to a private port used for communication on the private network.

The NAT device 104 may receive a data packet as a series of IP fragments from the client devices 102a. In some aspects, the NAT device 104 waits until all the IP fragments of the data packet arrive at the NAT device 104 before performing NAT and sending the data packet to its destination, for example, server 106a. Accordingly, the NAT device 104 may store the IP fragments in memory until they are transmitted. This may occur because the transport header information (which may be needed for port translation) needed to perform NAT on the IP fragments is only contained in the first IP fragment of a data packet, and not the remaining IP fragments. Thus, the NAT device 104 waits until all IP fragments of a data packet are received to determine the needed transport header information and NAT the data packet. The NAT device 104 uses the transport header information along with other information to create a NAT entry for the data packet. The NAT entry may be stored in a NAT database located on a memory of the NAT device 104. The data packet is then transmitted to the server 106a. The NAT entry is used by the NAT device 104 when a response is received from the server 106a to determine which client device 102 the response is associated with in order to send the response to the appropriate client device 102. Each NAT entry at the NAT device 104 may be for a particular packet flow (e.g., for data packets having the same characteristics such as local IP address, local port, target IP address, target port, global IP address, global port, and IP-ID). Accordingly, each NAT entry may correspond to and identify a particular IP/transport packet flow.

In certain aspects, the NAT device 104 may be configured to NAT a data packet before all IP fragments (e.g., before the first IP fragment of a series of IP fragments) of the data packet arrive at the NAT device 104. Accordingly, the NAT device 104 performs NAT on IP fragments as they arrive at the NAT device 104 (e.g., from the client 102a), and the IP fragments are sent to the destination device (e.g., the server 106a) before all the IP fragments of a packet are received at the NAT device 104. If the first IP fragment (e.g., 1) of a series of IP fragments (e.g., fragments 1, 2, 3, and 4 in order) of a data packet is received at the NAT device 104 before other IP fragments (e.g., 2, 3, and 4), the NAT device 104 creates a full NAT entry for the data packet as the transport header is included in the first IP fragment. The full NAT entry may include information such as a local IP address, local port, target IP address, target port, global IP address, global port, and IP-ID.

If a different IP fragment (e.g., 2, 3, and/or 4) of a data packet is received at the NAT device 104 before the first IP fragment (e.g., 1) of the packet is received, the NAT device 104 creates a partial NAT entry including only the information the NAT device 104 has based on the IP fragment and not the information from the transport header. For example, the partial NAT entry may include information such as a local IP address, target IP address, global IP address, global port, and IP-ID. However, the partial NAT entry may be missing a local port and a target port that would be included in a complete NAT entry. When the first IP fragment of the packet is received, the NAT device 104 updates the partial NAT entry to a complete NAT entry. The use of a partial NAT entry should not be problematic, on the basis that the destination device (e.g., server 106a) will not respond until all IP fragments of the packet are received by the destination, meaning that by the time the server 106a responds, the NAT device 104 will have a complete NAT entry. In some aspects, the server 106a may transmit an internet control message protocol (ICMP) error message before receiving all of the IP fragments of the packet. However, the NAT device 104 can NAT such ICMP error messages and transmit them back to the appropriate client device 102 based on the partial NAT entry.

The use of a partial NAT entry, allows the NAT device 104 to distinguish between IP fragments of different packets from different client devices 102 by determining which IP fragments have information that match the partial NAT entry. Therefore, the NAT device 104 can keep track of where the IP fragments and responses should be routed. Further, the partial NAT entry allows an error response received from a destination device such as the server 106a to be correctly routed to a client device 102 based on the information in the partial NAT entry.

In some aspects, the NAT device 104 may receive first IP fragments with a first IP-ID from a first client device 102a to send to a destination device such as the server 106a and also may receive second IP fragments with the first IP-ID from a second client device 102b to send to the same destination device, server 106a. The NAT device 104 may, in some aspects, NAT both the first IP fragments and the second IP fragments so they both have the same source and destination addresses (the source address being the NAT device 104 address and the destination address being the server 106a address) when sent to the server 106a. When the server 106a then receives the first IP fragments and the second IP fragments, the server 106a cannot distinguish that they are for different packets as the source address, destination address, and IP-ID for both sets of IP fragments is the same. This causes errors at the server 106a. For example, the server 106a assumes that both sets of IP fragments are from the same client device 102, and therefore are part of the same packet. The server 106a will try to use both sets of IP fragments to then reassemble a single packet. This results in reassembly errors and causes the packets to be dropped at the server 106a.

In some aspects, in order to solve the issue with the server 106a being unable to determine that different sets of IP fragments are for different packets, the NAT device 104 replaces the original IP-ID of the packet with a generated IP-ID. For example, a first client device 102a may send data packet fragments with a first IP-ID to the NAT device 104 to be sent to the server 106a. Further, a second client device 102b may send data packet fragments with the first IP-ID to the NAT device 104 to be sent to the server 106a. Accordingly, the NAT device 104 may generate a first new IP-ID that is unique to data packets sent from the first client 102a to the server 106a and a second new IP-ID that is unique to data packets sent from the second client 102b to the server 106a. The NAT device 104 may then replace the first IP-ID in the IP fragments for the first client device 102a with the first new IP-ID and replace the first IP-ID in the IP fragments for the second client device 102b with the second new IP-ID. The NAT device 104 may select the new IP-IDs based on any appropriate algorithm such as selecting IP-IDs in increasing order, random, pseudorandom, hash function, etc. The first new IP-ID and the second new IP-ID may each be different than the first IP-ID. Alternatively, one of either the first new IP-IP or the second new IP-ID may be the same as the first IP-ID and the other of the first new IP-IP or the second new IP-ID may be different than the first IP-ID. Accordingly, the server 106a receives IP fragments with different IP-IDs for data packets from each of the first client device 102a and the second client device 102b and can differentiate between them. Further, in some aspects, a partial NAT entry allows the NAT device 104 to keep track of which IP-ID is generated for which IP fragments as all the IP fragments for a given packet from a given client device 102 may have the same IP-ID.

As discussed above, the use of partial NAT entries may allow the NAT device 104 to transmit IP fragments of a data packet before all of the IP fragments of the data packet are received at the NAT device 104. Accordingly, the NAT device 104 may have reduced memory requirements as it does not need to store/queue IP fragments before transmission. Further, the NAT device 104 may not need to perform reassembly/re-fragmentations of IP fragments of a data packet when utilizing partial NAT entries. Accordingly, the number of operations to be performed by a CPU or processor of the NAT device 104 may be reduced. The lower CPU usage may also result in lower power consumption. In addition, by avoiding reassembly/fragmentation, data packets are transmitted with less delay, therefore increasing throughput at the NAT device 104.

Figure 2:
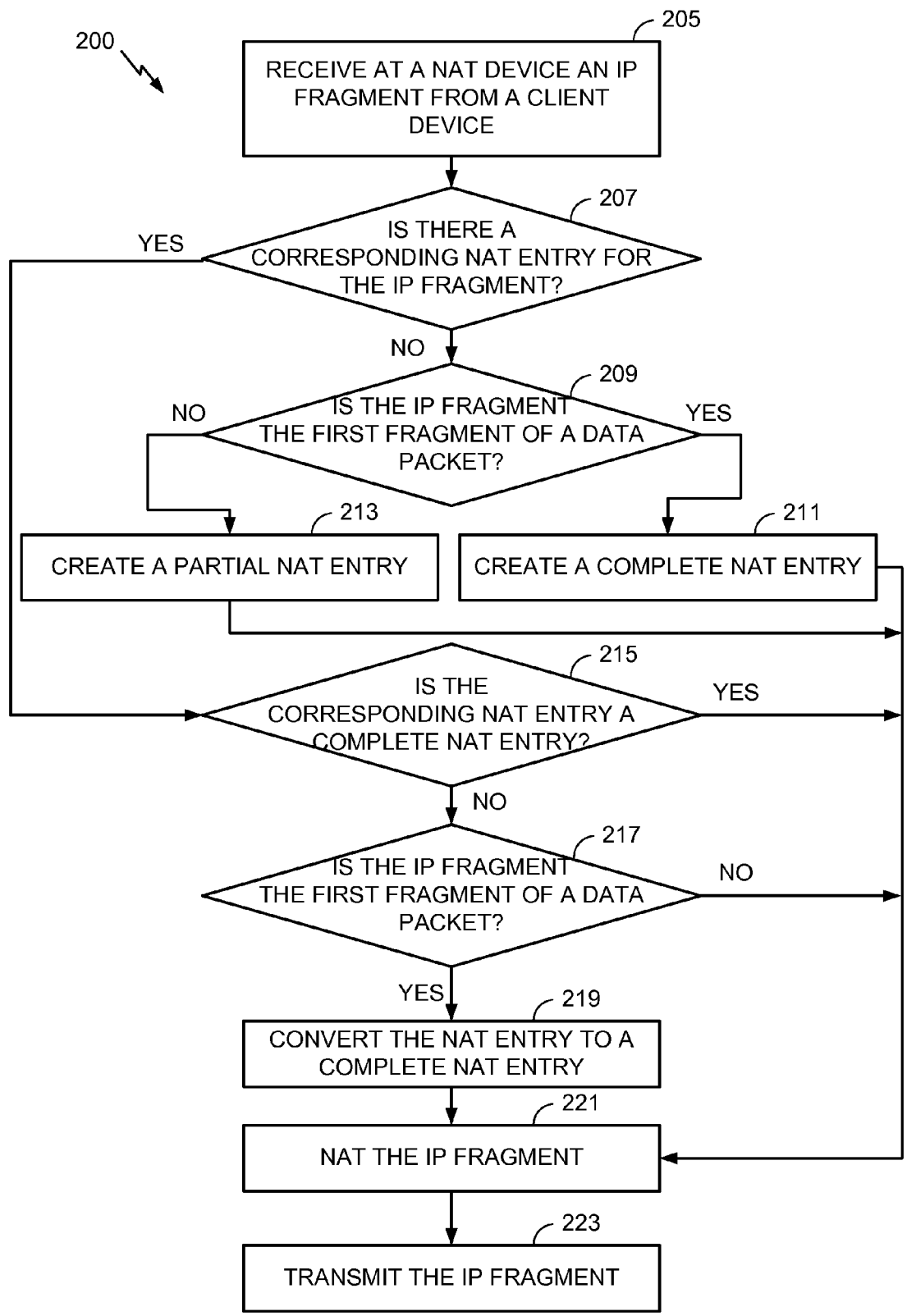
FIG. 2 is a flowchart illustrating an exemplary process for performing NAT using partial NAT entries.

FIG. 2 is a flowchart illustrating an exemplary process 200 for performing NAT using partial NAT entries. At a block 205, the NAT device 104 receives an IP fragment of a data packet from a client device 102. Further, at a block 207, the NAT device 104 determines if the IP fragment corresponds to a data packet for which there is already a corresponding NAT entry at the NAT device 104. If at block 207, the NAT device 104 determines there is no corresponding NAT entry, the process 200 continues to a block 209. If at the block 207, the NAT device 104 determines there is a corresponding NAT entry, the process 200 continues to a block 215.

At the block 209, the NAT device 104 determines whether the IP fragment of the data packet is the first IP fragment in order of the data packet. If at the block 209 the NAT device 104 determines the IP fragment of the data packet is the first IP fragment in order of the data packet, the process continues to a block 211. At the block 211, the NAT device 104 creates a complete NAT entry for the IP fragment based on the transport header in the IP fragment. If at the block 209 the NAT device 104 determines the IP fragment of the data packet is not the first IP fragment in order of the data packet, the process continues to a block 213. At the block 213, the NAT device 104 creates a partial NAT entry for the IP fragment. The process 200 then continues to a block 221.

At the block 215, the NAT device 104 determines whether the corresponding NAT entry is a complete NAT entry or a partial NAT entry. If the NAT device 104 determines the corresponding NAT entry is a partial NAT entry, the process 200 continues to a block 217. If the NAT device 104 determines the corresponding NAT entry is a complete NAT entry, the process 200 continues to a block 221

At the block 217, the NAT device 104 determines whether the IP fragment of the data packet is the first IP fragment in order of the data packet. If the NAT device 104 determines the IP fragment of the data packet is the first IP fragment in order of the data packet, the process 200 continues to a block 219. At the block 219, the NAT device 104 converts the partial NAT entry to a complete NAT entry based on the transport header in the IP fragment. The process 200 then continues to a block 221. If the NAT device 104 determines the IP fragment of the data packet is not the first IP fragment in order of the data packet, the process 200 continues to a block 221.

At the block 221, the NAT device 104 performs NAT of the IP fragment. Continuing at block 223, the NAT device 104 transmits the IP fragment to its destination (e.g., the server 106a).

Figure 3:
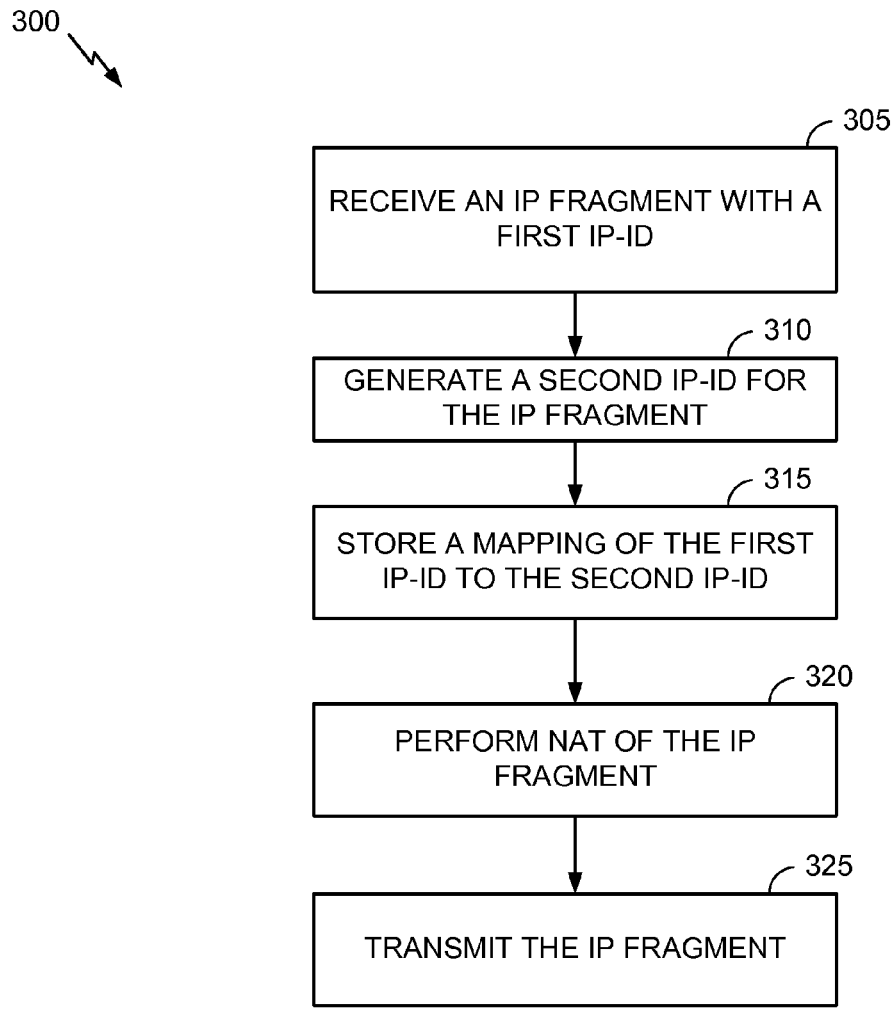
FIG. 3 is a flowchart illustrating an exemplary process 300 for replacing the IP-ID of an IP fragment with a new IP-ID unique to a flow associated with the IP fragment.

FIG. 3 is a flowchart illustrating an exemplary process 300 for replacing the IP-ID of an IP fragment with a new IP-ID unique to a flow associated with the IP fragment. At a block 305, the NAT device 104 receives an IP fragment having a first IP-ID over a first traffic flow. Continuing at a block 310, the NAT device 104 generates a second IP-ID for the IP fragment that is unique to the first traffic flow. Further, at a block 315, the NAT device 104 stores a mapping of the first IP-ID to the second IP-ID, for example as part of a partial or a complete NAT entry. Next, at a block 320, the NAT device 104 performs NAT of the IP fragment using the second IP-ID. Further, at a block 325, the NAT device 104 transmits the IP fragment to its destination (e.g., the server 106a).

One or ordinary skill in the art should recognize that various steps may by added or omitted from the processes 200 and 300. Further, the various steps of the processes 200 and 300 may be performed in a different order than described above.

Figure 4:
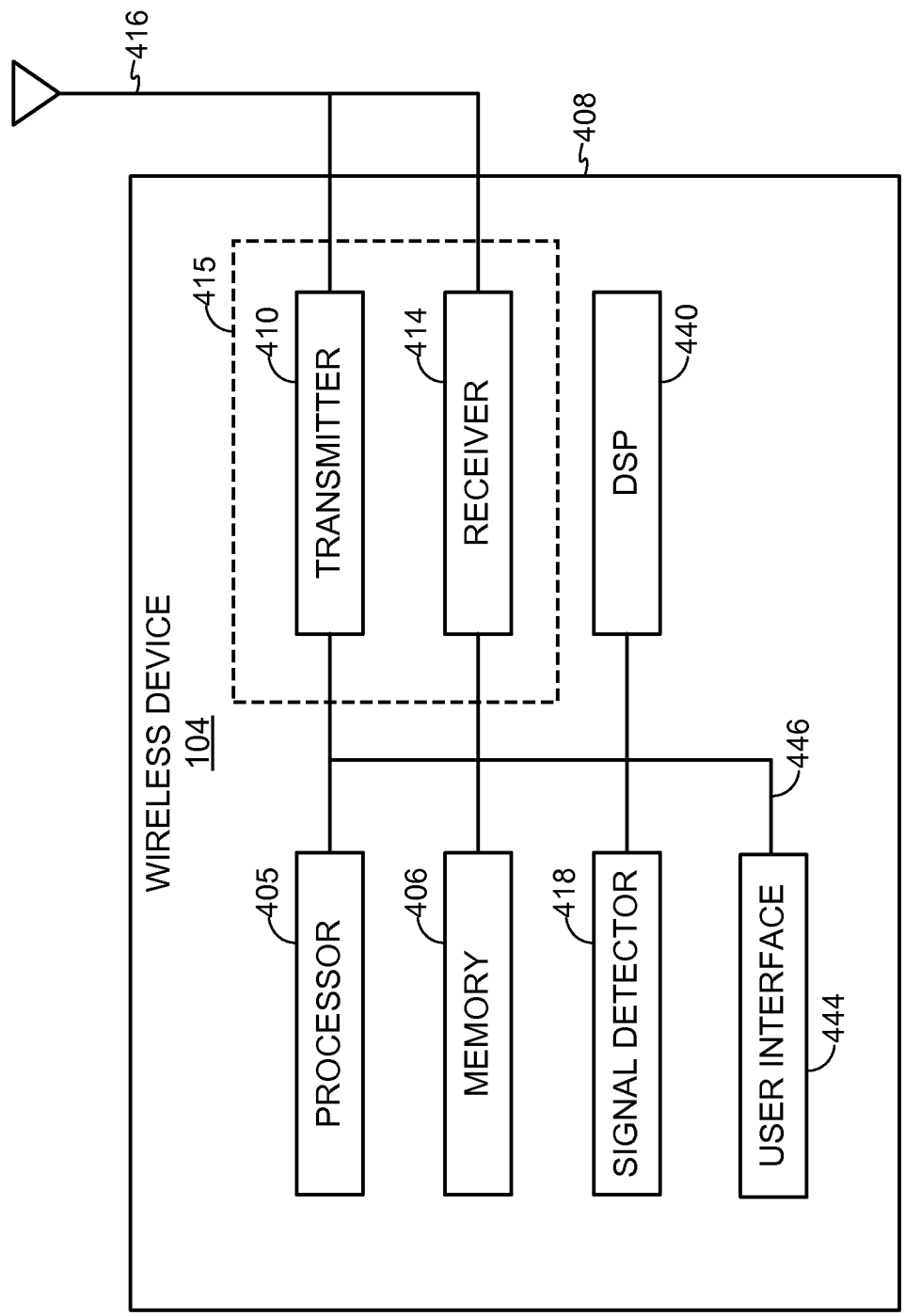
FIG. 4 is a functional block diagram of an exemplary NAT device of FIG. 1.

FIG. 4 is a functional block diagram of an exemplary NAT device 104 of FIG. 1. The NAT device 104 is an example of a device that may be configured to implement the various methods described herein. The NAT device 104 may comprise an AP or a computing device such as a mobile phone operating as a SoftAP.

The NAT device 104 may include a processor 405 which controls operation of the NAT device 104. The processor 405 may also be referred to as a central processing unit (CPU). Memory 406, which may include both read-only memory (ROM) and random access memory (RAM), provides instructions and data to the processor 405. A portion of the memory 406 may also include non-volatile random access memory (NVRAM). The processor 405 typically performs logical and arithmetic operations based on program instructions stored within the memory 406. The instructions in the memory 406 may be executable to implement the methods described herein.

When the NAT device 104 is implemented or used as a transmitting node, the processor 405 may be configured to generate data, process data, and control operation of the NAT device 104, as discussed in further detail above.

When the NAT device 104 is implemented or used as a receiving node, the processor 405 may be configured to generate data, process data, and control operation of the NAT device 104, as discussed in further detail above.

The processor 405 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The NAT device 104 may also include a housing 408 that may include a transmitter 410 and/or a receiver 414 to allow transmission and reception of data between the NAT device 104 and a remote location. The transmitter 410 and receiver 414 may be combined into a transceiver 415. An antenna 416 may be attached to the housing 408 and electrically coupled to the transceiver 415. The NAT device 104 may also include (not shown) multiple transmitters, multiple receivers, multiple transceivers, and/or multiple antennas. The transmitter 410 may be configured to wirelessly transmit data. The receiver 414 may be configured to receive data.

The NAT device 104 may also include a signal detector 418 that may be used in an effort to detect and quantify the level of signals received by the transceiver 415. The signal detector 418 may detect such signals as total energy, energy per subcarrier per symbol, power spectral density and other signals. The NAT device 104 may also include a digital signal processor (DSP) 440 for use in processing signals. The DSP 440 may be configured to generate a packet for transmission.

The NAT device 104 may further comprise a user interface 444 in some aspects. The user interface 444 may comprise a keypad, a microphone, a speaker, and/or a display. The user interface 444 may include any element or component that conveys information to a user of the NAT device 104 and/or receives input from the user.

The various components of the NAT device 104 may be coupled together by a bus system 446. The bus system 446 may include a data bus, for example, as well as a power bus, a control signal bus, and a status signal bus in addition to the data bus. Those of skill in the art will appreciate the components of the NAT device 104 may be coupled together or accept or provide inputs to each other using some other mechanism.

Although a number of separate components are illustrated in FIG. 4, those of skill in the art will recognize that one or more of the components may be combined or commonly implemented. For example, the processor 405 may be used to implement not only the functionality described above with respect to the processor 405, but also to implement the functionality described above with respect to the signal detector 418 and/or the DSP 440. Further, each of the components illustrated in FIG. 4 may be implemented using a plurality of separate elements.

It should be understood that FIG. 4 is just one example of a NAT device 104. The NAT device 104 may also comprise any suitable communication device as discussed above and may further comprise a memory for storing data and/or instructions, a processor for executing instructions and performing the methods described herein, and a transceiver (or a receiver and a transmitter) for communicating data and/or some other communication interface.

Figure 5:
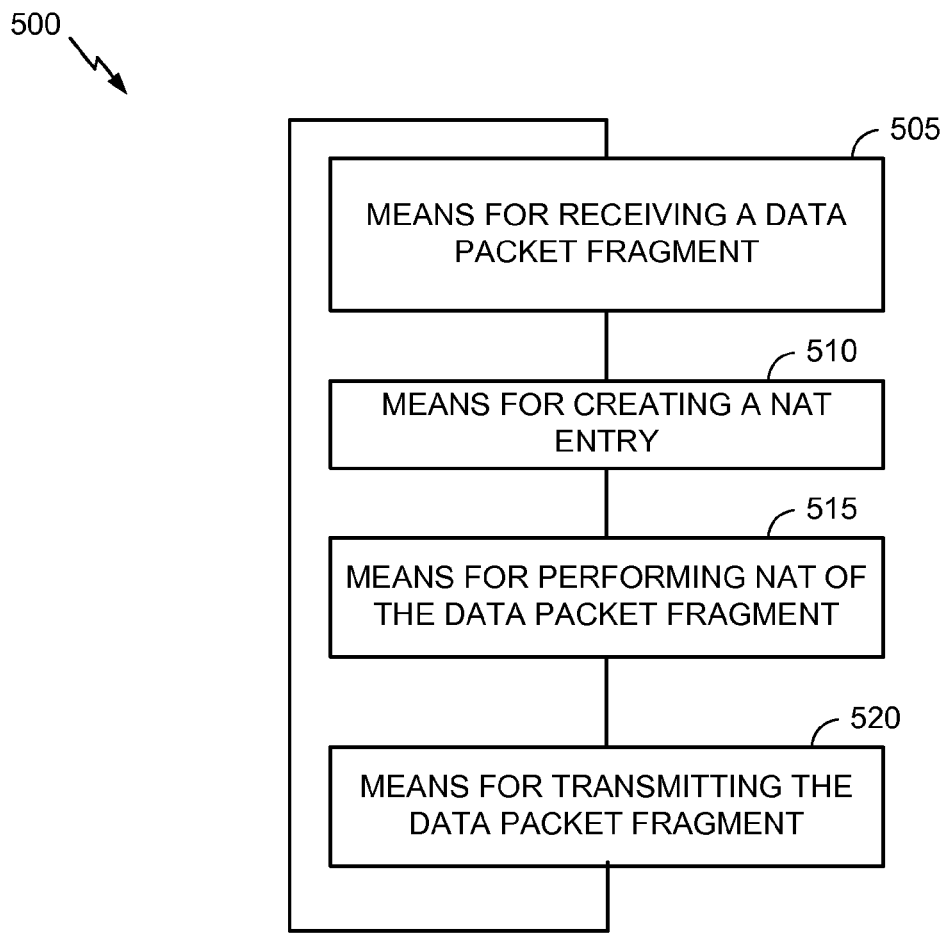
FIG. 5 is a functional block diagram of another exemplary NAT device of FIG. 1.

FIG. 5 is a functional block diagram of another exemplary NAT device of FIG. 1. Device 500 comprises means 505, 510, 515, and 520 for performing the various actions discussed with respect to FIG. 2.

Figure 6:
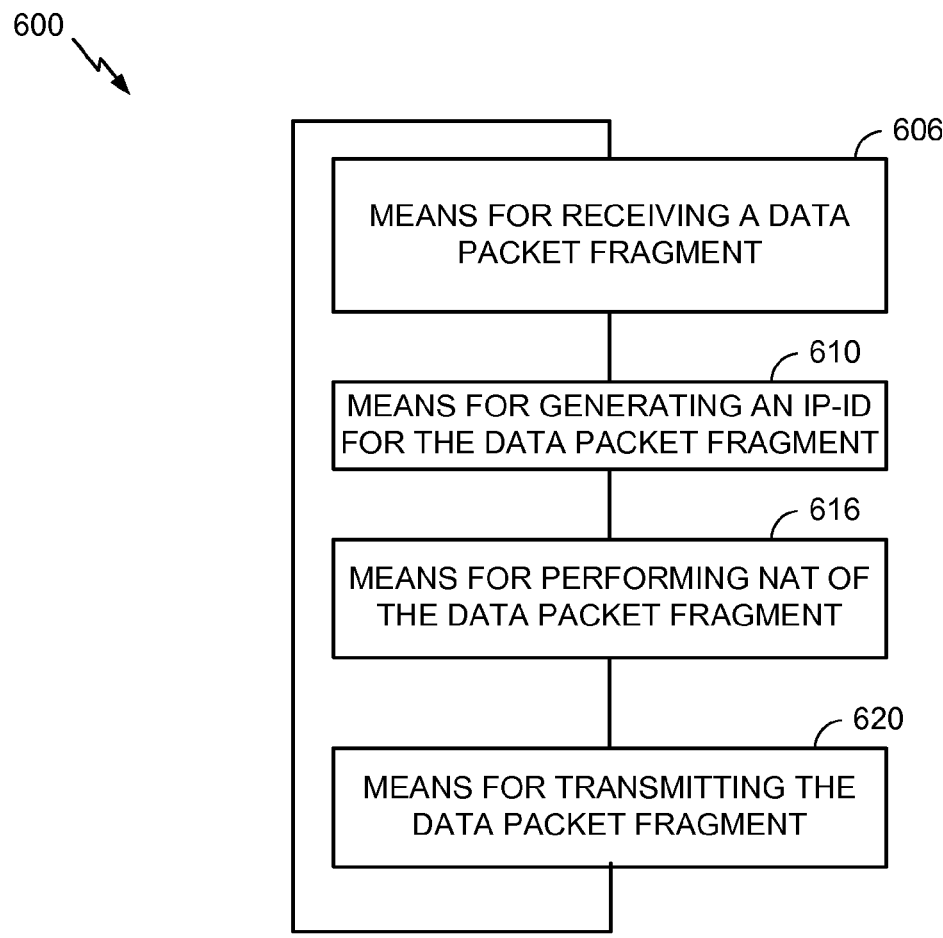
FIG. 6 is a functional block diagram of yet another exemplary NAT device of FIG. 1.

FIG. 6 is a functional block diagram of yet another exemplary NAT device of FIG. 1. Device 600 comprises means 606, 610, 616, and 620 for performing the various actions discussed with respect to FIG. 3.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for communicating in a network, the method comprising:
   receiving from a first device on a private network a data packet fragment of a sequence of data packet fragments that form an internet protocol (IP) data packet;
   creating an entry in a network address translation (NAT) table, wherein the entry is configured to be filled with routing information to allow routing of a response data packet from a second device on a public network to the first device on the private network;
   partially filling the entry with information from the data packet fragment if the data packet fragment is received before a first sequential data packet fragment of the sequence of data packet fragments, the partially filled entry containing insufficient information to route the response data packet from the second device on the public network to the first device on the private network;
   performing address translation on the data packet fragment based on the partially filled entry in the NAT table to generate a translated data packet fragment; and
   transmitting the translated data packet fragment to the second device on the public network before the entry is completely filled with information from the first sequential data packet fragment of the sequence of data packet fragments.

2. The method of claim 1, further comprising:
   receiving an additional data packet fragment of the IP data packet before the first sequential data packet fragment;
   performing address translation of the additional data packet fragment based on the partially filled entry in the NAT table to generate a translated additional data packet fragment; and
   transmitting the translated additional data packet fragment to the second device on the public network before the entry is completely filled with information from the first sequential data packet fragment of the sequence of data packet fragments.

3. The method of claim 1, wherein the receiving and transmitting are performed by a software access point (SoftAP).

4. The method of claim 2, further comprising:
   receiving the first sequential data packet fragment; and
   converting the partial entry in the NAT table to a completely filled entry in the NAT table based on information from the first sequential data packet fragment.

5. The method of claim 4, further comprising:
   receiving a remaining data packet fragment of the IP data packet;
   performing address translation on the remaining data packet fragment based on the completely filled entry in the NAT table to generate a translated remaining data packet fragment; and
   transmitting the translated remaining data packet fragment before receipt of the entire sequence of data packet fragments.

6. The method of claim 1, wherein the partially filled entry in the network address translation table does not include at least a portion of transport header information located in the first sequential data packet fragment.

7. An apparatus for communicating in a network, the apparatus comprising:
a receiver configured to receive from a first device on a private network a data packet fragment of a sequence of data packet fragments that form an internet protocol (IP) data packet;
a processor configured to:
create an entry in a network address translation (NAT) table, wherein the entry is configured to be filled with routing information to allow routing of a response data packet from a second device on a public network to the first device on the private network;
partially fill the entry with information from the data packet fragment if the data packet fragment is received before a first sequential data packet fragment of the sequence of data packet fragments, the partially filled entry containing insufficient information to route the response data packet from the second device on the public network to the first device on the private network; and
perform address translation on the data packet fragment based on the partially filled entry in the NAT table to generate a translated data packet fragment; and
a transmitter configured to transmit the translated data packet fragment to the second device on the public network before the entry is completely filled with information from the first sequential data packet fragment of the sequence of data packet fragments.

8. The apparatus of claim 7, wherein:
the receiver is further configured to receive an additional data packet fragment of the IP data packet before the first sequential data packet fragment;
the processor is further configured to perform address translation of the additional data packet fragment based on the partially filled entry in the NAT table to generate a translated additional data packet fragment; and
the transmitter is further configured to transmit the translated additional data packet fragment to the second device on the public network before the entry is completely filled with information from the first sequential data packet fragment of the sequence of data packet fragments.

9. The apparatus of claim 7, wherein the apparatus comprises a software access point (SoftAP).

10. The apparatus of claim 8, wherein:
the receiver is configured to receive the first sequential data packet fragment; and
the processor is configured to convert the partial entry in the NAT table to a completely filled entry in the NAT table based on information from the first sequential data packet fragment.

11. The apparatus of claim 10, wherein:
the receiver is configured to receive a remaining data packet fragment of the IP data packet;
the processor is configured to perform address translation on the remaining data packet fragment based on the completely filled entry in the NAT table to generate a translated remaining data packet fragment; and
the transmitter is configured to transmit the translated remaining data packet fragment before receipt of the entire sequence of data packet fragments.

12. The apparatus of claim 8, wherein the partially filled entry in the network address translation table does not include at least a portion of transport header information located in the first sequential data packet fragment.

13. An apparatus for communicating in a network, the apparatus comprising:
means for receiving from a first device on a private network a data packet fragment of a sequence of data packet fragments that form of an internet protocol (IP) data packet;
means for creating an entry in a network address translation (NAT) table, wherein the entry is configured to be filled with routing information to allow routing of a response data packet from a second device on a public network to the first device on the private network;
means for partially filling the entry with information from the data packet fragment if the data packet fragment is received before a first sequential data packet fragment of the sequence of data packet fragments, the partially filled entry containing insufficient information to route the response data packet from the second device on the public network to the first device on the private network;
means for performing address translation on the data packet fragment based on the partially filled entry in the NAT table to generate a translated data packet fragment; and
means for transmitting the translated data packet fragment to the second device on the public network before the entry is completely filled with information from the first sequential data packet fragment of the sequence of data packet fragments.

14. The apparatus of claim 13, further comprising:
means for receiving an additional data packet fragment of the IP data packet before the first sequential data packet fragment;
means for performing address translation of the additional data packet fragment based on the partially filled entry in the NAT table to generate a translated additional data packet fragment; and
means transmitting the translated additional data packet fragment to the second device on the public network before the entry is completely filled with information from the first sequential data packet fragment of the sequence of data packet fragments.

15. The apparatus of claim 13, wherein the apparatus comprises a software access point (SoftAP).

16. The apparatus of claim 14, further comprising:
means for receiving the first sequential data packet fragment; and
means for converting the completely filled entry in the NAT table to a completed entry in the NAT table based on information from the first sequential data packet fragment.

17. The apparatus of claim 16, further comprising:
means for receiving a remaining data packet fragment of the IP data packet;
means for performing address translation on the remaining data packet fragment based on the completely filled entry in the NAT table to generate a translated remaining data packet fragment; and
means for transmitting the translated remaining data packet fragment before receipt of the entire sequence of data packet fragments.

18. The apparatus of claim 13, wherein the partially filled entry in the network address translation table-does not include at least a portion of transport header information located in the first sequential data packet fragment.

19. A non-transitory computer readable medium comprising instructions that when executed cause an apparatus to:

receive from a first device on a private network a data packet fragment of a sequence of data packet fragments that forms an internet protocol (IP) data packet;

create an entry in a network address translation (NAT) table, wherein the entry is configured to be filled with routing information to allow routing of a response data packet from a second device on a public network to the first device on the private network;

partially fill the entry with information from the data packet fragment if the data packet fragment is received before a first sequential data packet fragment of the sequence of data packet fragments, the partially filled entry containing insufficient information to route the response data packet from the second device on the public network to the first device on the private network;

perform address translation on the data packet fragment based on the partially filled entry in the NAT table to generate a translated data packet fragment; and transmit the translated data packet fragment to the second device on the public network before the entry is completely filled with information from the first sequential data packet fragment of the sequence of data packet fragments.

20. The non-transitory computer readable medium of claim 19, further comprising instructions that when executed cause an apparatus to:

receive an additional data packet fragment of the IP data packet before the first sequential data packet fragment;

perform address translation of the additional data packet fragment based on the partially filled entry in the NAT table to generate a translated additional data packet fragment; and transmit the translated additional data packet fragment to the second device on the public network before the entry is completely filled with information from the first sequential data packet fragment of the sequence of data packet fragments.

21. The non-transitory computer readable medium of claim 19, wherein the apparatus comprises a software access point (SoftAP).

22. The non-transitory computer readable medium of claim 20, further comprising instructions that when executed cause the apparatus to:

receive the first sequential data packet fragment; and convert the partial entry in the NAT table to a completely filled entry in the NAT table based on information from the first sequential data packet fragment.

23. The non-transitory computer readable medium of claim 22, further comprising instructions that when executed cause the apparatus to:

receive a remaining data packet fragment of the IP data packet;

perform address translation on the remaining data packet fragment based on the completely filled entry in the NAT table to generate a translated remaining data packet fragment; and transmit the translated remaining data packet fragment before receipt of the entire sequence of data packet fragments.

24. The non-transitory computer readable medium of claim 19, wherein the partially filled entry in the network address translation table does not include at least a portion of transport header information located in the first sequential data packet fragment.

* * * * *